United States Patent [19]
Molitor

[11] Patent Number: 6,033,724
[45] Date of Patent: Mar. 7, 2000

[54] GOLF BALL MOLD PREPARATION TECHNIQUE AND COATING SYSTEM

[75] Inventor: John Peter Molitor, Hatfield, Mass.

[73] Assignee: Spalding Sports Worldwide, Inc., Chicopee, Mass.

[21] Appl. No.: 09/178,633

[22] Filed: Oct. 26, 1998

Related U.S. Application Data

[63] Continuation-in-part of application No. 08/753,674, Nov. 27, 1996, Pat. No. 5,827,567.

[51] Int. Cl.[7] .............................. B05D 5/08; B05D 7/22; B05D 1/36; B32B 27/00
[52] U.S. Cl. ...................... 427/135; 427/133; 427/407.1; 427/409; 427/327; 427/388.1; 428/421; 428/422; 428/463
[58] Field of Search .................................. 427/133, 135, 427/142, 156, 327, 328, 409, 405, 388.1; 428/421, 461, 35.9, 422, 463

[56] References Cited

U.S. PATENT DOCUMENTS

| | | | |
|---|---|---|---|
| 3,761,047 | 9/1973 | Mao | 249/115 |
| 4,274,637 | 6/1981 | Molitor | 273/235 R |
| 4,321,177 | 3/1982 | Wilkinson | 427/421 |
| 5,006,297 | 4/1991 | Brown et al. | 264/234 |
| 5,150,906 | 9/1992 | Molitor et al. | 273/220 |
| 5,547,761 | 8/1996 | Chapman, Jr. et al. | 428/422 |
| 5,663,255 | 9/1997 | Anolick et al. | 526/254 |
| 5,827,567 | 10/1998 | Molitor | 427/135 |
| 5,851,469 | 12/1998 | Muller et al. | 264/177.1 |

*Primary Examiner*—Diana Dudash
*Attorney, Agent, or Firm*—Laubscher & Laubscher

[57] ABSTRACT

A coating system and method for a golf ball injection mold having a land area and a patterned wall defining a hemispherical cavity is characterized by the application of a primer and a fluoropolymer top coat layer at least the patterned wall. The combined thickness of the coatings is no greater than 0.0007 inches. Owing to the thin coating, a golf ball molded in the cavity is easily ejected therefrom.

16 Claims, 2 Drawing Sheets

GOLF BALL MOLD PREPARATION TECHNIQUE AND COATING SYSTEM

This application is a continuation-in-part of U.S. application Ser. No. 08/753,674 filed Nov. 27, 1996, now U.S. Pat. No. 5,827,567.

BACKGROUND OF THE INVENTION

The present invention relates generally to game ball molds, and more particularly, to a method of preparing a game ball mold cavity for application of a coating system. The invention also relates to a dual region coating system which provides for good release of game ball products while providing a relatively long useful life for a single application of the system.

Solid multi-piece (two or more piece) golf balls typically have a spherical core formed from polybutadiene, zinc diacrylate and/or zinc dimethacrylate, and a peroxide initiator. One-piece golf balls generally have a similar composition. The cores and one-piece balls conveniently can be compression molded at an elevated temperature in a metallic mold having a surface coating of, e.g., polytetrafluoroethylene (PTFE). Such mold coatings provide for good release of golf ball cores from the molds. A non-stick coating material such as PTFE is required due to the presence of zinc diacrylate and/or zinc dimethacrylate, which have adhesive qualities. However, the drawback of using conventional fluorocarbon polymer coating systems applied in a conventional manner as golf ball mold coatings is that frequent recoating of the mold is required. Thus, it would be useful to develop a mold preparation technique which will provide for a longer useful life of a non-stick coating without reducing the useful life of the mold itself. Furthermore, it would be useful to provide a longer lasting coating for a mold which is used to form zinc diacrylate–and/or zinc dimethacrylate—containing game ball products such as one-piece golf balls and solid cores for game balls.

SUMMARY OF THE INVENTION

An object of the invention is to provide a method of preparing a game ball mold cavity for application of a non-stick coating.

Another object of the invention is to provide a mold coating technique which does not result in excessive wear to the mold cavity itself.

Another object of the invention is to provide a dual region coating system for game ball molds, such as golf ball mold cavities, the coating system having a prolonged useful life.

Another object of the invention is to provide a game ball mold for zinc diacrylate—and/or zinc dimethacrylate—containing game ball products with good release.

A further object of the invention is to provide a method of coating a game ball mold cavity with a long lasting coating.

Yet another object of the invention is to provide a golf ball mold which is particularly well suited for making golf ball cores and one-piece golf balls.

A further object of the invention is to provide a convenient and economical method for coating golf ball mold cavities.

Other objects of the invention will be in part obvious and in part pointed out more in detail hereafter.

The invention in a preferred form is a method of preparing a used game ball mold cavity for application of a coating. The method comprises the steps of obtaining a metallic game ball mold cavity having a land area and a wall defining a hemispherical opening, pretreating the land area and wall by contacting the mold cavity with an abrasive media until substantially all of any previous coating has been removed, and blasting the land area and wall with aluminum oxide media having a grit of about 180–400 under conditions sufficient to obtain a surface penetration of less than 0.2 mils. The abrasive media used in the pretreating step preferably is steel shop. The abrasive media preferably is applied by shot peening. The game ball mold preferably comprises stainless steel.

Another preferred form of the invention is a method of coating a game ball mold cavity comprising the steps of obtaining a metallic game ball mold cavity having a land area and a wall defining a hemispherical opening, pretreating the land area and wall by contacting the mold cavity with an abrasive media until substantially all of the prior coating has been removed blasting the land area and wall with aluminum oxide media having a grit of about 180–400 under conditions sufficient to obtain a surface penetration of less than 0.2 mils, applying a primer of perfluoroalcoxy resin (PFA) to the land area and wall, and applying a top coat of perfluoroalcoxy resin (PFA) to the land area and wall. The primer preferably is applied in the thickness of about 0.0003–0.0004 inches. The top coat preferably is applied in the thickness of about 0.0004–0.0006 inches. The abrasive media used in the pretreating step preferably comprises metal beads and more preferably comprises steel shot with a hardness $\geq 45$ Rockwall C.

Another preferred form of the invention is a coating system for a game ball mold cavity having a land area and a wall defining a hemispherical opening. The system comprises a first coating configured to be coated on the wall of the mold cavity and a second coating configured to be coated on the land area. The first coating comprises a composition which includes at least one fluorocarbon polymer selected from the group consisting of polytetrafluoroethylene (PTFE), fluorinated ethylene polymer (FEP), and polyfluoroalcoxy resin (PFA). The second coating comprises a composition of a metal component which is impregnated with PTFE, and which is different than the overall composition of the first coating. The metal component in the second coating preferably is porous, and preferably is nickel and/or chrome. The first coating preferably is nonmetallic, and even more preferably contains both PTFE and FEP.

In a particularly preferred form of the invention, the first coating has a thickness of at least 0.0015–0.002 inches. The second coating preferably has a thickness of at least 0.0005–0.0010 inches.

Yet another preferred form of the invention is a method of making a coated game ball mold cavity. The method comprises obtaining a game ball mold cavity having a land area and a wall defining a hemispherical opening. A first coating which comprises at least one fluorocarbon polymer selected from the group consisting of PTFE, FEP, and PFA, is formed on the wall of the cavity. A second coating which comprises a composition of metal and PTFE, and which is of a different overall composition than the first coating is formed on the land area of the mold.

In a particularly preferred form of the invention, the land area is masked while the first coating is applied to the wall of the mold cavity.

According to another embodiment of the invention, a coating is applied to the patterned cavities of an injection mold used to form the outer cover layer of a dimpled golf ball. The coating comprises a primer layer and a top coating having a total thickness no greater than 0.0007 inches. The and top coat preferably comprises a fluoropolymer material.

The thin coating layer enables easy ejection of finished golf balls from the cavity without diminishing the aerodynamic performance of the balls. If desired, the land area of the injection mold can be coated with thin layers of primer and top coat materials as well.

BRIEF DESCRIPTION OF THE FIGURES

Other objects and advantages of the invention will become apparent from a study of the following specification when viewed in the light of the accompanying drawing, in which.

DETAILED DESCRIPTION

As indicated above, the invention relates to a mold preparation technique and to a new and useful dual region coating system. The mold preparation technique provides game ball mold cavities with a long useful life. The mold preparation technique of the invention can be used to prepare a mold cavity for application of a uniform fluorocarbon polymer coating system over both the hemispherical walls and land areas of the mold, and also can be used to prepare molds in which the hemispherical walls and land areas will be coated with different compositions.

The dual region coating system of the present invention achieves a synergistic result because of the differences in the nature of the coatings applied in the hemispherical openings on the land areas of a mold cavity. The dual coating system results in a long useful life for a single coating application with good release of zinc diacrylate—and/or zinc dimethacrylate—containing game ball products such as golf ball cores and one-piece golf balls.

Figure 1:
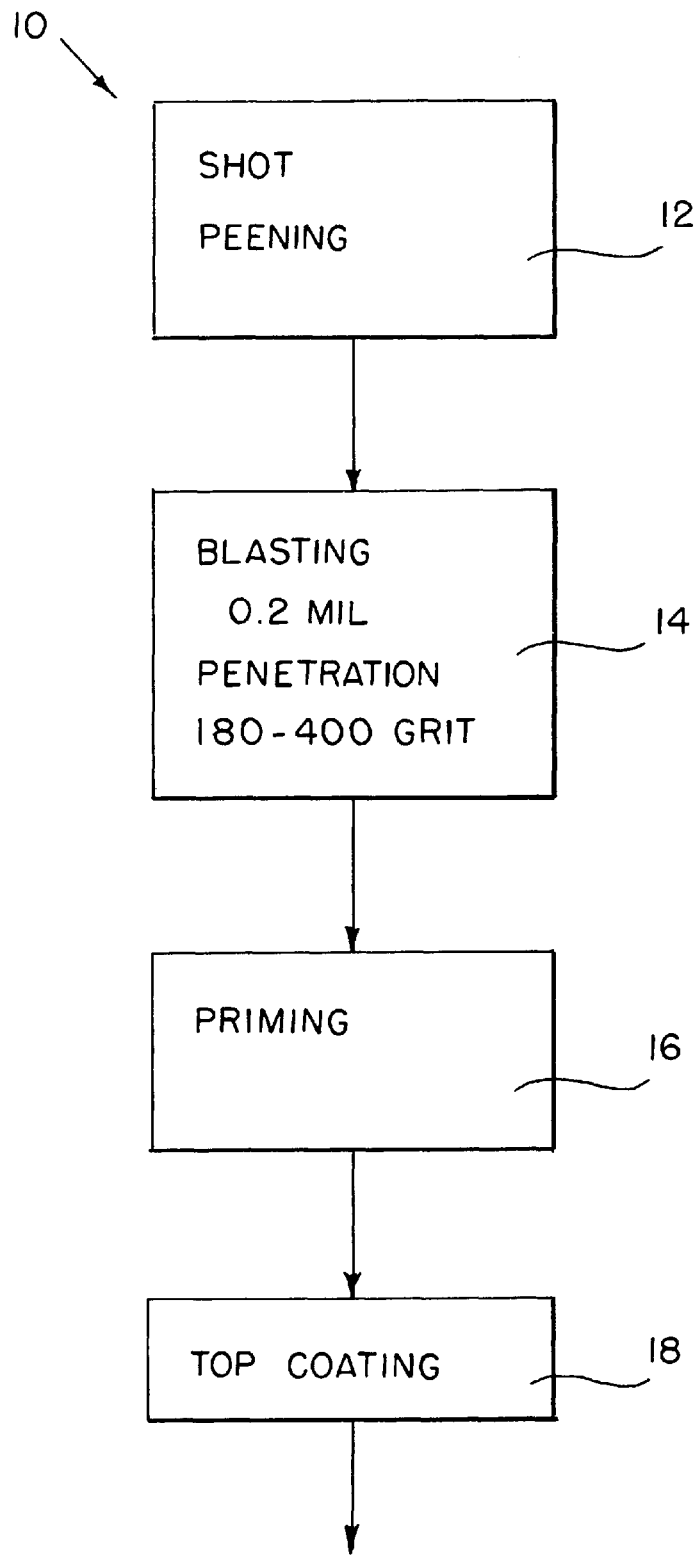
FIG. 1 is a flow chart showing the mold preparation technique of the invention.

Referring now to FIG. 1, a flow chart of the mold preparation technique according to the invention is shown and is designated as 10.

In the first step, the hemispherical opening and the land area of the mold cavity, which typically is made of stainless steel but also can be made of carbon steel or aluminum, are shot peened or air blasted with an abrasive media such as metal beads, hard plastic particles or the like in a shot peening zone 12. One preferred abrasive media is Guyson Metal Bead #900042. This step removes most of any prior coating off of the mold surfaces. Subsequently, the hemispherical opening and land area of the mold cavity are blasted with aluminum oxide powder having a grit of 180–400, more preferably 200–280, in a blasting zone 14. This grit size is substantially smaller than the 70–80 grit powder recommended by current supplies of mold preparation products. It is important to use a small grit material in order to avoid obtaining too high a penetration depth of the mold surface. A penetration depth greater than 0.01 mils but well below 0.2 mils is preferred.

After blasting, the hemispherical opening and land area of the mold cavity are primed in a priming zone 16 with a PFA primer such as, e.g., Dupont 420-703 or Witford E-8878b. The primer has a preferred (cured) thickness of about 0.3–0.4 mils. The primer can be applied by spraying or another suitable technique. The primer is cured under appropriate conditions, such as heating in an oven at about 430° F. metal temperature for about 10–15 minutes. A top coating of PFA material, such as Dupont 857-210 or Witford E-8878A, is applied over the primer coat in a top coating zone 18 to form a top coat layer with a (cured) thickness of about 0.4–0.6 mils. The top coat can be applied by spraying or another suitable technique. The top coat is then cured under appropriate conditions, for example at 750° F. metal temperature for 10–15 minutes.

As indicated above, another aspect of the invention is a coating system for game ball mold cavities which employs different coating compositions on the hemispherical wall and on the land area of the mold cavities. Molds for making golf ball cores containing polybutadiene and zinc diacrylate and/or zinc dimethacrylate typically are clamshell compression molds made of stainless steel. Compression molding of golf ball cores typically takes place at 280–350° F. A cylindrical slug of golf ball core material is placed in a spherical clamshell mold cavity, which is then closed such that the spacing between the upper and lower halves of the mold is, e.g., about 0.0008 inches. During molding, a small quantity of core material referred to as "flash" extends outward from between the rims of the (nearly) mating hemispherical walls in the mold cavities onto the lands of opposite mold cavities, forming an equatorial ring around the core. Typically, the bulk of this ring of core material is separated from the cores when the cores are removed from the mold. Any remaining flash is removed by brush tumbling. The shear force exerted by the flash on the land areas of the mold cavity during compression molding is extremely high and tends to wear away the coating on the land area. After the coating on the land areas has begun to wear away, the flash tends to stick to the land areas when the molds are opened after compression molding. As a result, a conventional fluorocarbon polymer-coated stainless steel golf ball core mold cavity having a 0.0005 inch or less thick conventional PTFE coating typically needs to be recoated after an average of 660 uses.

When the improved dual region coating system of the present invention is used, the metal coating impregnated with fluorocarbon polymer, which is formed on the land areas of the mold cavity, provides the land areas with improved durability and abrasion resistance and thus the mold requires less frequent recoating than when conventional coating systems are used.

To form the coating on the land areas, a metal preferably is plated on the land area and subsequently is impregnated with a fluorocarbon polymer. The metal preferably is a porous metal, and more preferably is electroless nickel, chrome plate, or the like. Nickel has been formed to be particularly useful because of its porosity.

The coating used on the second region of the mold, e.g. the wall of the cavities, preferably is FEP, PTFE, PFA, or the like. FEP top coatings have been found particularly advantageous due to their very low surface tension. The coating in the cavities preferably has an overall thickness of at least 0.0015 inches, and more preferably is about 0.0018–0.002 inches thick. This provides for good release and strong adhesion of the coating to the mold upon application. Preferably this overall coating includes a 0.0004–0.0008 inch thick primer layer of PTFE and two top coat layers of FEP each having a thickness of about 0.0006 inches or less.

The coating on the land areas of the mold preferably has a thickness in the range of 0.0005–0.0010 inches, and more preferably 0.0005 inches. This range of thickness provides a coating which has good adhesion and a relatively long useful life.

Figure 2:
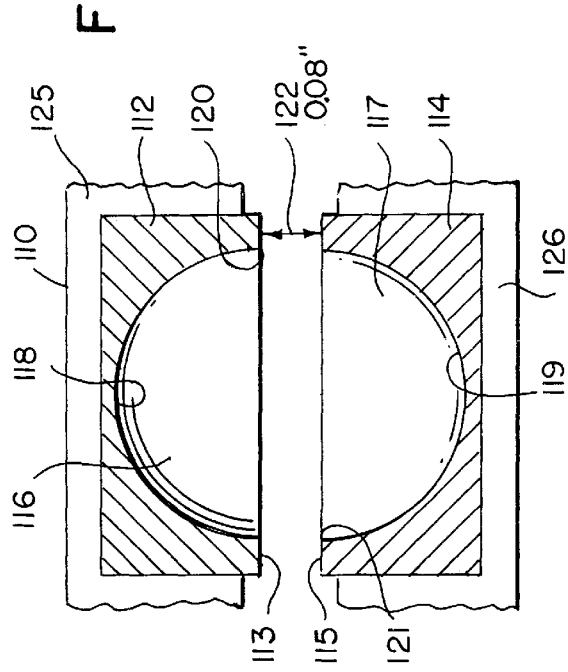
FIG. 2 shows a side elevational view of a section of a golf ball mold which is coated in accordance with one embodiment of the dual region coating system of the present invention.
Figure 3:
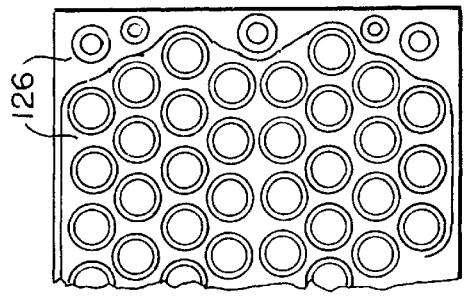
FIG. 3 is a partial top view of the lower half of a golf ball core mold.

Referring now to FIG. 2, a section of a coated game ball mold 110 and a method of coating a game ball mold according to the invention are depicted. An uncoated game ball mold is obtained. The mold has an upper mold half 112 and a substantially identical lower mold half 114. Each upper mold half 112 includes a plurality of mold cavities 116, each of which includes a hemispherical inner wall 118, a circular rim 120, and a ring-shaped land area 113. The mold cavities 116 are mounted in a mold frame 125. Each lower mold half 114 includes a plurality of mold cavities 117, each of which includes a hemispherical inner wall 119, a circular rim 121, and a rim-shaped land area 115. The mold cavities 117 are mounted in a mold frame 126, which is shown in both FIG. 2 and FIG. 3. Adjacent upper and lower inner walls 118 and 119 form a spherical mold for a golf ball core or the like. When the mold is closed, the land areas of the upper and lower mold halves 112, 114 are separated by a distance of, e.g., about 0.08 inches, forming a gap 122, which is shown in exaggerated form in FIG. 2. The mold 110 is made of stainless steel. The upper and lower halves 112, 114 are moved together and apart by conventional means, which are not shown.

In order to coat the cavities with the dual region coating system, the mold cavities 116, 117 are removed from the mold frames 125, 126. If the mold cavities have been used previously, they are cleaned in order to remove the prior coating. The land areas 113, 115 of the mold cavities 116, 117 are masked using any suitable means, such as metal mask or tape. The inner walls 118, 119 of the hemispherical mold cavities 116, 117 are lightly abraded using 180–400 grit aluminum oxide. A primer coating preferably comprising PTFE is applied to the inner walls 118, 119 in a thickness of 0.0005 inches, and is cured under suitable conditions. Subsequently, a first top coat of FEP is applied over the primer coating and cured, preferably followed by at least one more top coat of FEP. One preferred fluorocarbon polymer coating system of the inner walls 118, 119 of mold cavities 116, 117 is a base coat of Dupont 958-203 Teflon-S (PTFE) followed by two top coats of Dupont 856-200 FEP, each of which is separately cured.

After the third coat has been placed on the inner walls 118, 119 and has been cured, the land areas 113, 115 of the mold cavities 116, 117 are unmasked. The land areas 113, 115 of the mold cavities 116, 117 are then placed in nickel plating solution in order to plate nickel thereon. It is not necessary to mask the inner walls 118, 119 because the non-stick coating on the inner walls 118, 119 prevents the plating of nickel thereon. After plating is complete, the land areas 113, 115 are impregnated with PTFE. The mold is then ready for use. A particularly preferred nickel plating—PTFE impregnation process—is that of Poly-Ond® (Poly-Plating Inc., Chicopee, Mass.)

The mold frames 125, 126 preferably are coated in the same manner as the inner walls 118, 119. Thus one coat of PTFE primer, followed by two top coats of FEP, preferably are applied.

Figure 4:
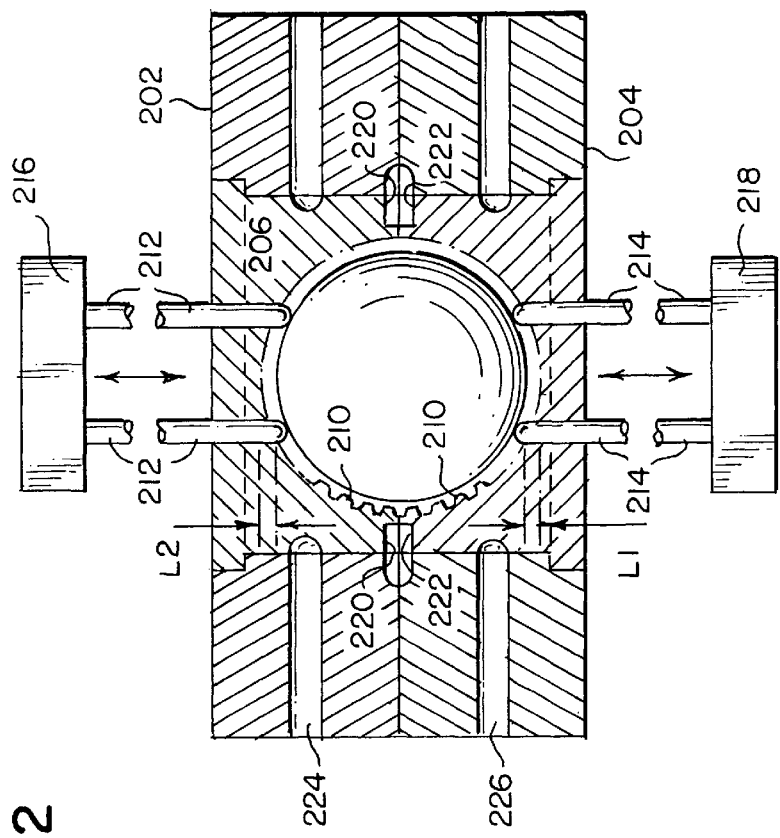
FIG. 4 is a sectional view of a golf ball injection mold which is coated in accordance with the invention.

Turning now to FIG. 4, the coating of a golf ball injection mold will be described according to an alternate embodiment of the invention. The injection mold comprises an upper mold plate 202 and a lower mold plate 204, both formed of metal. The upper plate 202 contains a plurality of hemispherical cavities 206 and the lower plate 204 contains a plurality of corresponding hemispherical cavities 208.

Only one of each hemispherical cavity 206, 208 in shown in FIG. 4. A circular parting line is defined where each cavity terminates with the corresponding planar land area or surface of the upper and lower plates. When the plates are brought together in contiguous relation by any suitable displacement mechanism (not shown), the corresponding upper and lower hemispherical cavities cooperate to defined a plurality of spherical cavities, one for each golf ball being formed.

Each hemispherical cavity 206, 208 includes a patterned surface 210 which will define a dimple pattern in the outer surface of the golf ball pattern. The upper hemispherical cavities 206 also include a plurality of retractable core pins 212 and the lower hemispherical cavities include a plurality of retractable core pins 214. The pins haves axes perpendicular to the parting lines of the respective plates and are extensible into the spherical cavity to support a golf ball core during injection molding of the cover layer of the ball. The upper retractable core pines 212 are connected with a piston 216 and the lower retractable core pins 214 are connected with a piston 218. The operation of the upper and lower pistons 216, 218 is controlled by a controller (not shown).

In order to supply a thermoplastic material to each cavity to form the cover layer on a golf ball core supported therein, a runner is provided in the upper and lower plates. The runner comprises a network of feeder lines 220, 222 in the upper and lower plate surfaces, respectively, which define flow channels when the plates are in contiguous relation. Surrounding each hemispherical cavity are runner rings which evenly distribute thermoplastic material to the cavities to surround the ball core.

In order to decrease the time required for cooling and setting of the thermoplastic material on the golf ball cores, a coolant such as water is supplied adjacent to each hemispherical cavity. More particularly, each mold plate includes coolant channels such as channel 224 in the upper plate 202 and channel 226 in the lower plate 204.

The direct contact of coolant with the upper and lower hemispherical cavities provides uniform cavity cooling at the poles (at the bottom of the cavities) as well as at the equator (at the parting line) of the golf ball resulting in the ability to closely control the size and roundness of the golf ball. This is because any shrinkage of the ball cover as the thermoplastic material hardens is more uniform. The cavity parting line clearance is not allowed to exceed 0.0002 inches and is preferably held to zero clearance in order to minimize the clamping force required to keep the tool closed during injection and to prevent flashing at the parting line while aiding in maintaining consistent size and roundness to the ball.

After the golf ball cover material has hardened, the plates are separated and the golf balls are ejected from the cavities. To this end, the lower plate retractable core pins 214 are displaced into the respective cavities a distance corresponding to the cover thickness L1 to eject the balls from the cavities. Movement of the pins 214 is controlled by a controller which operates the pistons 218 to displace the pins 214.

To facilitate separation of a finished golf ball from the injection mold, a thin coating is applied to the patterned surfaces 206 and 208 of the upper and lower cavities. The coating must be extremely thin, e.g., no greater than 0.0007 inches, so as not to adversely influence the dimple pattern formed by the pattern 210 during injection molding of the cover layer of the ball.

After thorough cleaning of the mold cavity surfaces as described above with reference to FIG. 1, a primer layer such as Dupont 420-703 is applied and cured under appropriate conditions. Next, a top coating of a fluoropolymer material such as Dupont 857-210 is applied over the primer coat and cured. The Alternate materials for the primer and top coat layers are Dupont 958-203 and Dupont 856-200, respectively. This combination results in a coating that is more slippery but less durable than the combination of Dupont 420-703 and Dupont 857-210. Moreover, a three-layer coating may be applied to the mold cavity surfaces, again to a total thickness no greater than 0.0007 inches. In this embodiment, the primer layer comprises Dupont 420-703, the first top coat layer comprises Dupont 857-210 (PFA), and the second top coat layer comprises Dupont 856-200 (FEP).

The use of a thin permanent release coating according to the invention lasts much longer than the prior temporary release coatings. During the injection molding of golf balls using temporary release coatings, the cavities must be re-coated hourly which reduces the output of the molding apparatus. Moreover, the build up of the temporary release coating results in a higher incidence of imperfections in the golf ball dimple surface which adversely affect the flight characteristics of the ball. Conversely, the thin primer and top coatings according to the invention lasts much longer. In a six cavity mold, the inventive coating lasts for approximately 19,000 shots, which produces 9,500 dozen golf balls. These balls have less imperfections in the dimpled surface and thus have the desired aerodynamic properties.

If desired the thin coating according to the invention can also be applied to the land area, e.g. the flat surface of the mold plates between the hemispherical cavities. Thus, the entire surface of the upper and lower mold plates, including the cavities can be sprayed with the primer material, which is cured, and then one or two layers of top coating material, which are also cured, and the mold is ready for use.

Having generally described the invention, the following examples are included for purposes of illustration so that the invention may be more readily understood and are in no way intended to limit the scope of the invention unless otherwise specifically indicated.

EXAMPLE 1

Game Ball Mold Preparation and Application of Uniform Coating

A used golf ball core mold was obtained having mold cavities made of 416 stainless steel and mold frames made of 4140 stainless steel. In order to remove the remaining portion of an earlier coating and to prepare the mold cavity surfaces for application of a new coating, the hemispherical walls and land areas of the mold cavities were shot peened with metal abrasive media (Metal Bead #900042, Guyson Corp.) at a rate of 440 lbs/min for 10 minutes. Subsequently, the hemispherical walls and land areas of the mold cavities were blasted with 240 grit aluminum oxide media (Dawson-McDonald) in an aluminum oxide blasting machine EQ no MC-93 (Empire Abrasive Equipment Co.). Before blasting, any remaining golf ball core residue was scraped from the mold cavities. The mold cavities were blasted to a penetration depth of less than 0.2 mils.

Next, the mold cavities were preheated to 120–180° F. The hemispherical walls and land areas of the preheated mold cavities were sprayed with Dupont 420-703 primer. About 18 to 20 grams of the primer was applied to a heated set of mold cavities, the set of mold cavities including hemispheres for 90 golf ball cores. Spraying was conducted using a Binks model 95 spray gun with a 63 PB air cap and a 63 B SS fluid nozzle (Chicago, Ill.) The primer was cured at 430° F. metal temperature for 15 minutes, resulting in a cured coating having a thickness of 0.0003–0.0005 inches. The same type of Binks Spray gun, air cap, and fluid nozzle were then used to apply a Dupont 857-210 PFA topcoat to the hemispherical walls and land areas of the mold. Next, 48–50 grams of topcoat were applied to the primed, cured mold half which was at a mold temperature of 100–200° F. The top coated mold was cured at 750° F. metal temperature for 15 minutes, and resulted in a cured top coat having a thickness of 0.0004–0.0006 inches.

When more than one truck of mold cavities is cured at once, the curing temperature for curing the top coat can be increased to 770° F.

The mating surfaces of the mold frames 125, 126 were pretreated, blasted, and coated using the same procedure as was used for the mold cavities.

The molds which were coated according to the process described above were then used to form zinc diacrylate—containing golf ball cores. The molds lasted for 990 cycles before recoating was required.

EXAMPLE 2

Application of Dual Coating System to Game Ball Mold

A golf ball core mold with new mold cavities made of 416 stainless steel and used and cleaned mold frames made of 4140 stainless steel was obtained. The mold cavities were removed from the mold frames. The land area of the mold cavities was masked with tape and the hemispherical walls of the mold cavities were lightly abraded with 240 grit aluminum oxide. A base coat of Dupont 958-203 Teflon-S (which contains tetrafluoroethylene and hexafluoropropylene) was applied to the hemispherical walls of the cavities in a (cured) thickness of about 0.0006 inches and was cured at 400° F. metal temperature for 15 minutes. Two top coats of Dupont 856-200 FEP each having a (cured) thickness of about 0.0005–0.0007 inches were applied to the hemispherical walls, and the mold cavities were 0.0007 inches were applied to the hemispherical walls, and the mold cavities were cured for 15 minutes at 700° F. metal temperature after the application of each coating. The cured thickness of the three-layer coating was 0.0015–0.0020 inches. The land areas of the mold cavities were unmasked. The mold cavities were then sent to Poly-Plating Inc., Chicopee, Mass., for application of a coating of nickel impregnated with PTFE on the land areas of the mold cavities in accordance with the Poly-Ond® process. Details of the Poly-Ond® process and the chemistry of the resulting coating are believed to be trade secrets. The mating surfaces of the mold frames were coated by the same process as the hemispherical walls of the mold cavities. The golf ball mold was used continuously for 1,386 cycles before encountering major sticking problems. This is 210% longer than the 660 cycle useful life of molds coated with a conventional Franklynn-Diamond water-based coat material having a thickness of 0.0005 inches or less.

What is claimed:

1. A coating system for a golf ball injection mold cavity having a land area and a patterned wall defining a hemispherical cavity comprising
   (a) a primer layer coated on the wall of the golf ball injection mold cavity; and
   (b) at least one top coat layer of fluoropolymer material coated on said primer layer, the total thickness of said primer and top coat layers being no greater than 0.0007 inches, whereby a dimpled golf ball formed in the mold cavity is prevented from sticking to the wall of the mold when the golf ball is ejected therefrom.

2. A coating system as defined in claim 1, wherein said primer layer has a thickness of about 0.0002–0.0004 inches.

3. A coating as defined in claim 1, wherein said top coat layer has a thickness of about 0.0002–0.0005 inches.

4. A coating system as defined in claim 1, wherein said primer and top coat layers are coated on the area of the golf ball injection mold cavity.

5. A coating system as defined in claim 1, and further comprising a second top coat layer of fluoropolymer material applied to said primer and top coat layers.

6. A coating system as defined in claim 1, wherein said primer layer comprises perfluoroalcoxy resin (PFA) and said top coat layer comprises a different perfluoroalcoxy resin (PFA).

7. A coating system as defined in claim 6, and further comprising a second top coat layer of fluorinated ethylene polymer (FEP).

8. A coating system as defined in claim 1, wherein said primer layer comprises polytetrafluoroethylene (PTFE) and said top coat layer comprises fluorinated ethylene polymer (FEP).

9. A method of making a coated golf ball injection mold cavity, comprising the steps of (a) obtaining a golf ball mold cavity having a land area and a patterned wall defining a hemispherical cavity;

(b) forming a primer layer on the wall of the golf ball injection mold cavity; and (c) forming at least one a top coat layer of fluoropolymer material on said primer layer, the total thickness of said primer and top coat layers being no greater than 0.0007 inches, whereby a dimpled golf ball formed in the mold cavity is prevented from sticking to the wall of the mold when the golf ball is ejected therefrom.

10. A method as defined in claim 9, wherein said primer layer has a thickness of about 0.0002–0.0004 inches.

11. A method as defined in claim 9, wherein said top coat layer has a thickness of about 0.0002–0.0005 inches.

12. A method as defined in claim 9, and further comprising the steps of forming the primer and top coat layers on a land area of the golf ball injection mold cavity.

13. A method system as defined in claim 9, and further comprising the step of forming a second top coat layer of fluoropolymer material on said primer and top coat layers.

14. A method as defined in claim 9, wherein said primer layer comprises perfluoroalcoxy resin (PFA) and said top coat layer comprises a different perfluoroalcoxy resin.

15. A method as defined in claim 9, and further comprising the step of forming a second top coat layer of fluorinated ethylene polymer (FEP).

16. A method as defined in claim 9, wherein said primer layer comprises polytetrafluoroethylene (PTFE) and said top coat layer comprises fluorinated ethylene polymer (FEP).

* * * * *